United States Patent
Long et al.

(10) Patent No.: US 6,279,737 B1
(45) Date of Patent: Aug. 28, 2001

(54) FOOD CASING PACKAGE AND METHOD OF PREPARING

(75) Inventors: Larry Clyde Long, Hinsdale; Frederick Maynard Merritt, II, Lockport; Jeffery Allen Oxley, Naperville, all of IL (US)

(73) Assignee: Viskase Corporation, Chicago, IL (US)

( * ) Notice: Subject to any disclaimer, the term of this patent is extended or adjusted under 35 U.S.C. 154(b) by 0 days.

(21) Appl. No.: 08/905,539

(22) Filed: Aug. 4, 1997

(51) Int. Cl.[7] .............................. B65D 81/22; F16L 11/00; B65B 55/00
(52) U.S. Cl. ................. 206/205; 53/431; 138/118.1; 206/802; 426/135; 428/34.8
(58) Field of Search ................ 206/205, 443, 206/802; 138/118.1; 438/34.8; 53/431; 426/105, 135

(56) References Cited

U.S. PATENT DOCUMENTS

| | | | |
|---|---|---|---|
| 3,064,803 | * 11/1962 | Eichin et al. | 206/802 X |
| 3,250,629 | 5/1966 | Turbak . | |
| 3,528,825 | 9/1970 | Doughty . | |
| 3,616,489 | 11/1971 | Voo et al. . | |
| 3,617,312 | 11/1971 | Rose . | |
| 3,971,187 | 7/1976 | McNeill et al. . | |
| 4,295,563 | * 10/1981 | Becker et al. | 206/205 |
| 4,409,251 | * 10/1983 | Higgins | 138/118.1 X |
| 4,585,655 | * 4/1986 | Sherbanenko | 206/802 X |
| 4,664,861 | 5/1987 | Pritikin et al. . | |
| 4,671,414 | * 6/1987 | Bandt et al. | 206/802 X |
| 4,784,186 | * 11/1988 | Stenger et al. | 138/118.1 |
| 4,842,022 | * 6/1989 | Oxley et al. | 138/118.1 |
| 4,867,204 | 9/1989 | Ellis et al. . | |
| 4,897,295 | * 1/1990 | Erk et al. | 428/34.8 |
| 5,399,399 | * 3/1995 | Benik et al. | 428/34.8 |
| 5,501,886 | * 3/1996 | Hammel et al. | 428/34.8 |

FOREIGN PATENT DOCUMENTS 29 26 590    1/1981    (DE) .

OTHER PUBLICATIONS

*Radial Winding Associates, Inc.*, Apr. 29, 1975, 3 pages.

* cited by examiner

*Primary Examiner*—Bryon P. Gehman
(74) *Attorney, Agent, or Firm*—Roger Aceto

(57) ABSTRACT

Disclosed is a package containing a plurality of cut lengths of fibrous casing which are moisturized to substantially soaked levels of moisture and are retained in an evacuated plastic bag wherein the moisture level of the casing is derived from free water added into the bag prior to evacuation. Also disclosed is a method of packaging cut lengths of casing which provides for the addition of soaked levels of moisture to the casing in the bag.

9 Claims, 2 Drawing Sheets

FOOD CASING PACKAGE AND METHOD OF PREPARING

TECHNICAL FIELD

The present invention relates to a food casing package and more particularly to a food casing package comprising cut lengths of a cellulosic fibrous casing.

BACKGROUND OF THE INVENTION

Cellulose food casings are well known in the art and are widely used in the stuffing of meat and processed meat products such as sausages and the like. One type of such casing is known as fibrous casing. Fibrous casing comprises a paper web coated with a regenerated cellulose. Briefly, in the process for making a fibrous casing a non woven paper such as an abaca paper is coated with a cellulose derivative such as viscose. The viscose coated paper then is contacted with a regenerating bath containing an acid. The resulting chemical reaction regenerates the cellulose derivative to form the so called "fibrous" casing. As a possible alternative, the paper web can be coated with a cellulose solution formed by the direct dissolution of cellulose with an amine oxide cellulose solvent. The regeneration of the cellulose is accomplished without a chemical reaction simply by contacting the solution-coated web with a cellulose regenerating bath comprising a cellulose nonsolvent such as water.

Fibrous casings take one of several forms which generally can be classified as "soak" or "no soak" depending upon whether the casings as sold, contain a sufficient amount of moisture to permit stuffing.

For example, a long length of fibrous casing containing about 7–10% moisture based on the weight of dry cellulose in the casing can be shirred to a much shorter length. These casings can be stored for long periods without the need for special packaging. Just prior to use, these casings are soaked in warm water for twenty minutes or more in order to provide the higher moisture content for stuffing. After soaking, the moisture content of the casing may be as high as 170% or more based on the weight of dry cellulose in the casing.

Another form of fibrous casing which is soaked are so-called cut lengths of casing. Cut lengths are much shorter pieces of fibrous casings, usually from about twelve inches (30.5 cm) up to about seventy-two inches (183 cm) in length. Cut lengths are closed at one end by longitudinally pleating the casing and then capping, clipping or tying the pleated end. Cut lengths of casing usually are bundled together and the entire bundle is placed in a soak tank of warm water prior to use to raise the moisture content to the same levels as noted above.

Long lengths of casing also can be sold in a premoisturized form. For example, for certain stuffing applications, a moisture level less than full soaked levels is sufficient. For these applications, the casing is provided with a controlled amount of moisture, usually from about 40 to about 45% based on the weight of dry cellulose. The moisturized casing then is shirred or reeled. The moisturized casing is packaged in moisture barrier packaging to retain its moisture content during storage prior to use. This casing is called "no soak" casing as it can be used right out of the package without the need to add further moisture such as by soaking. Due to the relatively high moisture content of this casing, it usually contains a water soluble antimycotic or is packaged by gas flushing to prevent the growth of mold on the casing.

While long lengths of fibrous casing, either in a shirred form or on reels, have been sold in a no soak condition, heretofore cut lengths of fibrous casing have not, to applicants' knowledge, been sold in a no soak condition. One reason for this is that cut lengths generally are used for stuffing applications where the casing must contain a very high moisture content for good stuffing performance and this moisture level is provided by soaking. It is difficult to apply this quantity of moisture to the casing in a commercial operation by means other than by soaking. For example, one way to moisturize a no soak casing is to spray a suitable aqueous solution onto the casing as the casing is being rewound from one reel to another. However, applying a "soaked" amount of moisture in this fashion may require slowing down the rereeling process or several passes through the moisturizing apparatus in order to bring the moisture content up to the level of a soaked casing. Another way to add moisture is to slug the casing by running the casing through an internally retained volume of water. However, this requires an unreasonable long slug length.

Another reason why cut lengths have not been provided in a soaked condition is that it is difficult to close the casing by clipping, tying or capping the end of the cut length when it contains very high, soaked levels of moisture. Accordingly, one would have to close the casing first and then add the moisture and this in turn requires handling the soaked casing for packaging. In view of the high moisture content of the soaked casing, handling it is a messy proposition. Also, the high moisture content of the casing renders it susceptible to mold growth and handling the soaked casing increases the likely hood of contamination.

For all of the above reasons it has been customary and most economical to provide cut lengths of fibrous casing in a relatively dry condition wherein the dry casings are soaked in warm water by the user just prior to use of the casing to provide the high moisture levels required for stuffing.

Accordingly, it is an object of the present invention to provide a cut length fibrous casing in a fully moisturized, ready-to-stuff condition.

Another object of the present invention is to provide a cut length fibrous casing which eliminates the need for soaking by the user just prior to stuffing.

A further object of the present invention is to provide a casing package comprising cut lengths of fibrous casing contained in a bag wherein the casings within the bag are in a substantially fully soaked condition and ready to use.

Yet another object of the present invention is to provide a method of soaking and packaging cut lengths of fibrous casing which eliminates the need to handle a fully soaked fibrous casing.

SUMMARY OF THE INVENTION

In accordance with the present invention, the relatively dry cut lengths of casing are closed at one end by tying, clipping or capping as is conventional in the art. The cut lengths are then bundled and inserted into an appropriate bag having moisture barrier properties. Such a bag, for example, preferably is a heat sealable multilayer plastic bag wherein one layer of the bag is a moisture barrier material such as PVDC. Free water is added to the bag in an amount sufficient to provide the casing with a total moisture content of about 100 to 170% and preferably from about 120 to 165% based on the weight of cellulose in the casing. The actual amount of water which is added may vary in each case depending upon other constituents which may be added along with the water such as, for example, an antimycotic or a softener such as glycerin. In particular the free water can be added as a solution such as salt water or an aqueous solution containing a water soluble antimycotic or water activity suppressant.

After free water is added to the bag, air is evacuated from the bag and the bag is sealed, preferably by heat sealing. Evacuation, preferably, is to a level of about 0.05 to 0.15 atmospheres. In evacuating the bag, care should be taken to prevent lowering the pressure to such an extent that a significant amount of the added free water within the bag also is removed.

It has been found, that over time the free water added to the bag will equilibrate throughout the cut lengths after evacuation. In the time prior to use, each of the cut lengths within the bag is moisturized to the desired moisture level. Moreover, the evacuation of air from the bag collapses the bag about the bundle of cut lengths so the free water which was added is pressed into close contact with the casing. This is believed to assist in the speedy uptake of the water by the casing. The evacuation also helps to retard mold growth on the moist casing by removing air and in addition forms a tight, neat appearing package for the casing.

The casing package may be maintained in storage pending sale or use. To use the casing, the package is opened and the casings extracted. Since the casings are fully moisturized, they can be used directly without the need for further soaking at the user's facility. This has the advantage of providing a fully soaked casing without the need for the user to maintain soak tanks or to deal with the dripping of water onto the floor and equipment as casing is removed from the soak tank and transferred to the stuffing machine.

Accordingly, the present invention may be characterized in one aspect thereof by a casing package comprising:

a) a plurality of flattened cut lengths of fibrous cellulosic casing arranged in a stack and bundled together, the stack is optionally folded onto itself to shorten the overall length of the stack;

b) each of the cut lengths in the stack has a first end which is open and a second end which is closed, the second end preferably being closed by having a series of longitudinal folds or pleats formed at the second end and having a closure means such as a clip, tie, cap or the like disposed about or encompassing the pleats or folds for holding them together;

c) the stack of cut length casing being disposed in a sealed, airtight, at least partly evacuated plastic bag; and d) each of the cut lengths of casing has a moisture content of 100% to 170% by weight of the dry cellulose in the casing and the moisture content of the casings being derived from an in situ addition of free water to the cut lengths of casing in the sealed bag.

In its method aspect, the present invention may be characterized by a method of preparing a package including a plurality of substantially fully soaked cut lengths of fibrous cellulosic casings comprising the steps of:

a) arranging a plurality of relatively dry cut lengths of fibrous cellulose casing in a stack, each of the cut lengths having an open end, a closed end and a moisture content of about 7% to about 10% based on the dry weight of the cellulose in the casing;

b) optionally folding the stack lengthwise to reduce its overall length;

c) inserting the stack into a plastic bag;

d) adding a measured amount of free water into the bag, the amount of free water added being sufficient to raise the moisture content of all the casing in the bag to a level of 100% to 170% by weight of dry cellulose in the casing;

e) evacuating air from the bag to collapse the bag about the stack of casing;

f) sealing the bag to maintain it air tight; and g) maintaining the sealed bag for at least a time prior to opening sufficient to permit the added free water to equilibrate throughout each cut length such that each cut length of casing is at a substantially uniform moisture content of 100% to 170% by weight of dry cellulose in the casing.

These and other advantages and characterizing features of the present invention will become more apparent upon consideration of the following detail description thereof when taken in connection with the accompanying drawings depicting the same.

DETAILED DESCRIPTION OF THE INVENTION

Figure 1:
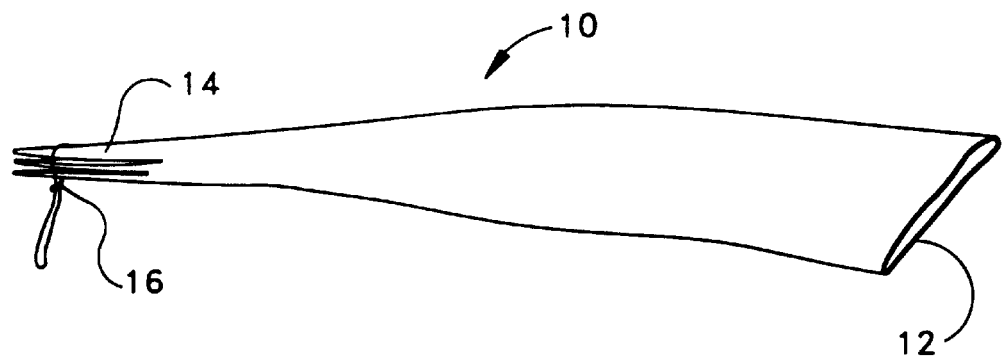
FIG. 1 is a perspective view showing a typical cut length of casing.

Referring to the drawings, FIG. 1 shows a typical cut length of fibrous casing generally indicated at 10. The cut length is from twelve inches (30.5 cm) to about seventy-two inches (183 cm) long and has a flat width of from about 2.0 to about 6.0 inches (50.8 cm to 15.24 cm). The cut length is a fibrous reinforced cellulosic casing which has a moisture content of about 7% to about 10% and a glycerin content of about 20% to 40% based on the weight of cellulose in the casing. The casing has a first open end 12 and a closed second end 14. The second end of the casing is closed by folding, pleating or otherwise gathering the casing together and applying a clip, tie or cap 16 to the gathered casing. For example, a typical arrangement is to form the second end 14 with a series of longitudinal pleats or folds which are held together by a tie. The cut length, as thus described, is well known in the art and by itself forms no part of the present invention.

Figure 2:
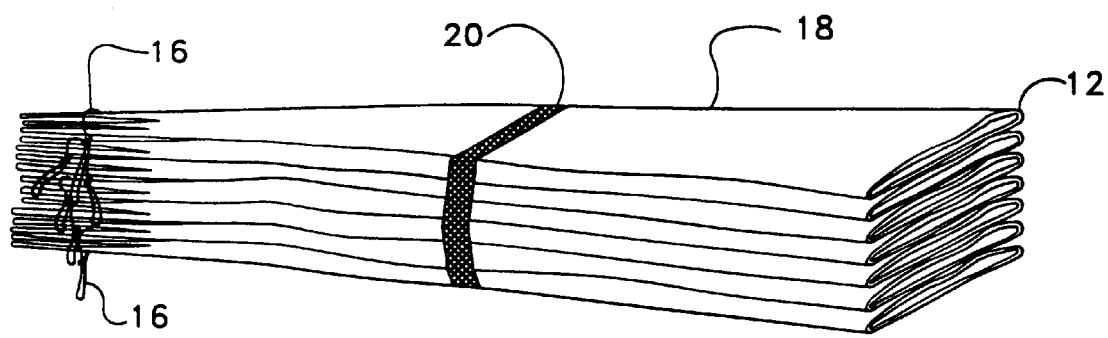
FIG. 2 is a view similar to FIG. 1 only showing a bundle comprising a plurality of cut lengths of fibrous casing.

FIG. 2 shows a plurality of cut lengths all laid to a flat width and stacked one on another. The stack 18 may comprise any number of cut lengths depending upon the user's requirements and the size of the casing. Generally, there are from twenty-five to fifty cut lengths in the stack but the number can be more. Usually, the casings in the stack are bundled together by a chord 20. Prior to the present invention, the stack or bundle 18 was packaged with other like bundles for shipment, no special packaging being required as the casings had a relatively low moisture content. For use, the user simply removed a bundle from its package and placed it in a soak tank in order to provide the casing with the high moisture content required for stuffing. Thereafter, individual cut lengths are removed from the bundle and placed on a stuffing horn for stuffing.

Figure 3:
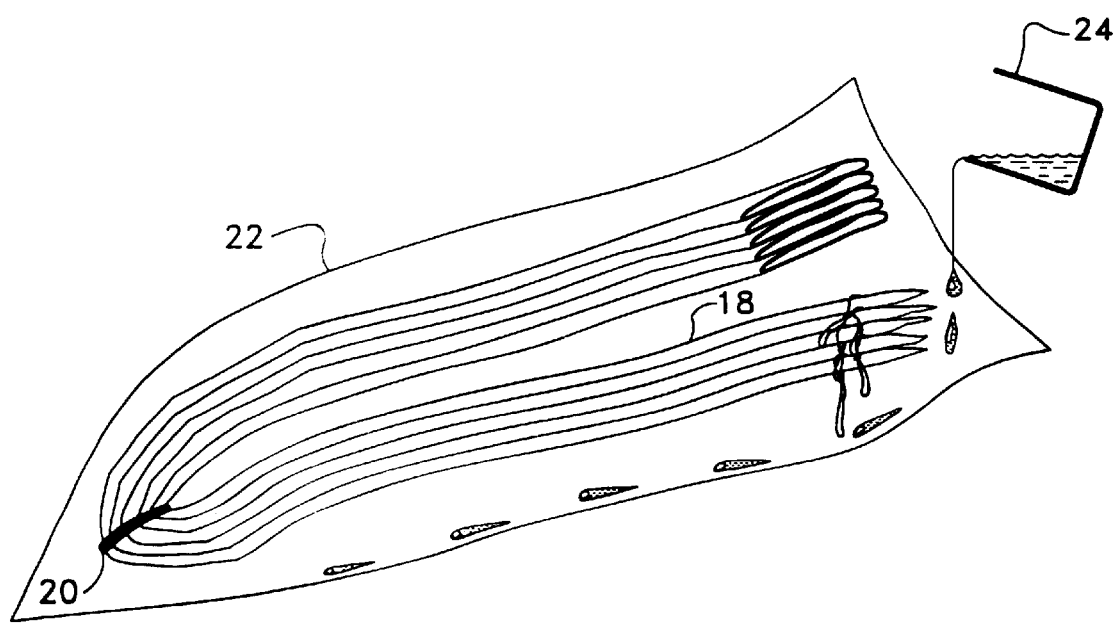
FIG. 3–4 illustrates in schematic fashion, steps in the method of the present invention.

In accordance with the present invention however, the bundle 18 is placed into a plastic bag 22 (FIG. 3). Depending upon the length of the bundle 18, it may be convenient to fold the bundle onto itself to shorten the overall length of the bundle. The plastic bag 22 preferably has a low moisture permeability and is heat sealable.

After the bundle is loaded into the plastic bag, an amount of free water is added to the bag. This can be accomplished simply by holding the bag upright and pouring a measured amount of water into the bag from a suitable source such as a measured container 24. The amount of water poured into the bag is an amount calculated to raise the moisture level of each cut length in the bag to the same level as if the casing were placed in a soaked tank which is 100% or more based on the weight of the cellulose in the casing and up to about 170%. The actual amount of free water added will vary depending upon whether the water is added as an aqueous solution along with other constituents such as an antimycotic. Preferably, the amount of free water which is added will be sufficient to raise the casing moisture content to 120% to 165% based on the weight of cellulose in the casing as this amount approaches a soaked level.

It should be appreciated that the dry cut length contains glycerin. Whereas this glycerin would be washed out and replaced by water during a conventional soaking step, adding free water into the bag will not necessarily replace the glycerin in the casing. Accordingly, the glycerin content of the casing determines to some extent the amount of total moisture which can be added to the casing in accordance with the method of the present invention.

The next step is to evacuate air from the bag. Evacuation of the bag can be accomplished by closing the open end of the bag about an evacuation tube inserted into the bag. After air is evacuated, the tube is withdrawn and the open end is either clipped or heat sea. It is preferred, however, to place the bag into an evacuation chamber for purposes of evacuating air from the bag. Suitable evacuation apparatus is known in the art.

Figure 4:
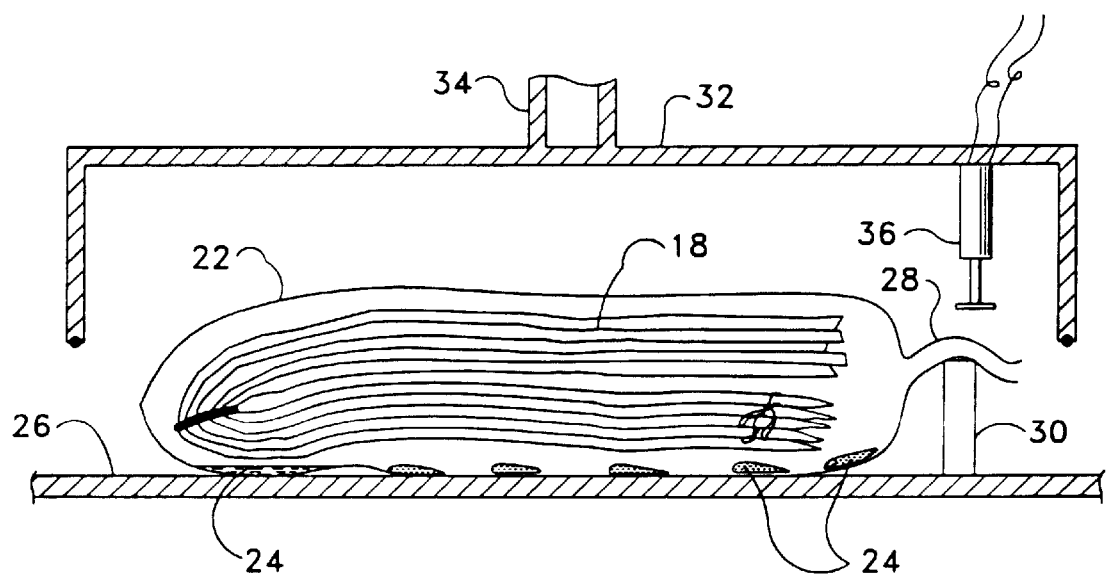

FIG. 4 shows the bag 22, containing a folded bundle 18 of casing and a measured amount of free water 24, located on a platen 26. The open end 28 of the bag is draped across an anvil 30 and arranged to its flat width. The anvil is sufficiently high to prevent draining of the free water from the bag. A hood 32 then lowers over the bag and seals against the platen to form a closed chamber and then air is evacuated from the chamber through an outlet 34. The operation of the apparatus eventually exhausts air from the bag. A heat sealer 36 carried by the hood then closes against the anvil to s effect a heat seal closure across the flat width of the bag. The result is the evacuation of the bag to an absolute pressure of about 0.01 to 0.15 atmospheres and preferably to about 0.05 to 0.10 atmospheres.

This produces a heat sealed evacuated bag containing the bundle of cut lengths and an amount of free water sufficient to elevate the casing in the sealed bag to substantially the same level as a soaked casing. Evacuation of air collapses the bag close about the bundle so that water in the bag is pressed against the casing. This and the tendency of the moisture to equilibrate throughout the casings in the evacuated bag eventually bring each cut length up to the desired moisture content.

In view of the relatively large amount of free water which must be added in order to raise the moisture level of the casing to a soaked level, the casing will have a relatively high water activity level conducive to mold growth. Accordingly, it is preferred that the free water added to the bag be in the form of an aqueous solution including a suitable antimycotic to inhibit the growth of mold on the highly moisturized casing. For example, the water can be in a salt solution or propylene glycol, a sorbate, propionate or other water soluble antimycotic can be added to the water to provide a barrier to mold growth. This antimycotic together with the evacuation of air should provide a barrier to mold growth during the time that the casing is in its sealed package.

For use, the bag is opened and the bundle removed. Each cut length can be placed on a stuffing horn without further soaking by the user. This has the distinct advantage of eliminating the need for soak tanks and the time needed to soak the casing.

Thus, it should be appreciated that the present invention accomplishes its intended objects in providing a ready-to-use, substantially fully soaked cut length of casing which eliminates the need to soak the casing just prior to use. Moreover, by fully moisturizing the cut lengths in its package, there is no need to alter the current manufacturing procedure of closing one end of the cut lengths prior to soaking. The addition of free water to the bag eliminates the need to handle a fully soaked casing to package it. Also, the subsequent evacuation of the bag brings the free water into close contact with the casing, lowers the vapor pressure within the bag to facilitate the movement of the free moisture throughout the casings in the bag and provides a degree of antimycotic protection while also providing a neat appearing package for the bundle of cut lengths of casing. Further, the addition of water into the bag does not displace the glycerin in the dry cut length. Accordingly, the soaked casing in accordance with the present invention will contain up to 30% glycerin based on the weight of cellulose in the casing which is speculated may enhance the stuffing properties of the casing.

Having thus described the invention in detail, what is claimed as new is:

1. A food casing package comprising:
    a) a plurality of flattened cut lengths of fibrous casing arranged in a stack;
    b) each of said cut lengths in said stack having a first open end and a second end which is closed;
    c) said stack of cut lengths of casing being disposed in a sealed, air tight and at least partly evacuated plastic bag, said bag having moisture barrier properties; and
    d) each of said cut lengths having a glycerine content of 20% to 40% and a uniform moisture content of 100% to 170% based on the weight of dry cellulose in the casing, said moisture content being derived from a measured amount of free water added into said bag prior to evacuation and sealing of the bag the in situ moisturization of said cut lengths in said bag after evacuation.

2. A package as in claim 1 wherein each cut length contains a water soluble antimycotic.

3. A package as in claim 1 wherein said moisture content is added as a salt solution.

4. A package as in claim 1 wherein the bag is evacuated to an absolute pressure of 0.05 to 0.15 atmospheres.

5. A method of preparing a package of cut lengths of fibrous casings comprising the steps of:
    a) arranging a plurality of relatively dry cut lengths of fibrous casing in a stack, each of said cut lengths having an open end and a closed end and each having a moisture content of about 7% to 10% and a glycerine content of 20% to 40% based on the dry weight of cellulose in the casing;
    b) inserting the stack into a plastic bag having moisture barrier properties;
    c) introducing a measured amount of free water into the bag, the amount of free water being sufficient to raise the moisture content of each cut length to a level of 100% to 170% based on the weight of dry cellulose in the casing;
    d) evacuating air from the plastic bag to collapse the bag about the stack thereby pressing the free water into close contact with the stack of cut lengths of casing;

e) sealing the bag to provide an air tight closure while maintaining the bag in an evacuated condition; and f) maintaining the sealed bag for at least a time interval prior to opening sufficient to permit the added free water to equilibrate throughout each cut length such that each cut length after said time interval is at a substantially uniform moisture content of 100% to 170% and a glycerine content of 20% to 40% based on the weight of dry cellulose in the casing.

6. A method as in claim 5 comprising adding sufficient free water to raise the casing moisture content to 120% to 165% based on the weight of dry cellulose in the casing.

7. A method as in claim 5 comprising adding free water into the bag as an aqueous solution containing an antimycotic.

8. A method as in claim 5 comprising evacuating the bag to an absolute pressure of 0.05 to 0.15 atmosphere.

9. A method as in claim 8 comprising forming the closed end of each cut length by gathering the casing at one end into a plurality of longitudinal folds or pleats and then applying means for holding the gathered pleats together by one of the steps of tying, clipping or capping.

* * * * *

UNITED STATES PATENT AND TRADEMARK OFFICE
CERTIFICATE OF CORRECTION

PATENT NO.    : 6,279,737 B1  
DATED         : August 28, 2001  
INVENTOR(S)   : Larry Clyde Long et al.

It is certified that error appears in the above-identified patent and that said Letters Patent is hereby corrected as shown below:

Column 6,  
Line 41, add -- for -- after "the bag"

Column 8,  
Line 6, cancel "8" and replace with -- 5 --

Signed and Sealed this

Twenty-fourth Day of February, 2004

JON W. DUDAS  
*Acting Director of the United States Patent and Trademark Office*